United States Patent
Arnold

(10) Patent No.: US 6,609,000 B1
(45) Date of Patent: Aug. 19, 2003

(54) PROCESS FOR GENERATING AN ADDRESS DIRECTORY

(75) Inventor: Jörg Arnold, Heidelberg (DE)

(73) Assignee: IP2H AG, Bern (CH)

(*) Notice: Subject to any disclaimer, the term of this patent is extended or adjusted under 35 U.S.C. 154(b) by 0 days.

(21) Appl. No.: 09/601,486

(22) PCT Filed: Feb. 5, 1999

(86) PCT No.: PCT/DE99/00302

§ 371 (c)(1),
(2), (4) Date: Aug. 2, 2000

(87) PCT Pub. No.: WO99/40708

PCT Pub. Date: Aug. 12, 1999

(30) Foreign Application Priority Data

Feb. 5, 1998 (DE) .......................................... 198 04 336

(51) Int. Cl.[7] .......................... H04M 11/00; H04M 3/42; H04M 1/00
(52) U.S. Cl. ........................ 455/406; 455/414; 455/551; 379/114.02; 379/144.01
(58) Field of Search ................................. 455/403, 405, 455/406, 408, 410, 414, 415, 550, 551, 558, 559, 435, 456; 379/56.1, 56.2, 56.3, 114.01, 114.02, 114.03, 127.01, 127.06, 144.07

(56) References Cited

U.S. PATENT DOCUMENTS 5,727,057 A * 3/1998 Emery et al. .......... 379/201.07
6,396,269 B1 * 5/2002 Hajnal et al. ................ 324/304
6,453,167 B1 * 9/2002 Michaels et al. ........... 455/466

FOREIGN PATENT DOCUMENTS

DE 195 35 021 A1 7/1997
DE 197 19 002 A1 11/1997
DE 19719002 * 11/1997 .......... H04M/15/28
DE 197 26 956 A1 1/1998

* cited by examiner

*Primary Examiner*—Nay Maung
*Assistant Examiner*—Edan Orgad
(74) *Attorney, Agent, or Firm*—Alston & Bird LLP

(57) ABSTRACT

A method of creating an address directory from address data of subscribers in a telecommunications network, wherein the address data comprise a subscriber identification and a position identification allocated to the subscriber, is characterized with respect to a simple creation of the address directory, in that during a payment procedure of charges for the use of the telecommunications network, address data of the subscriber are transmitted at least in part to a data acquisition station.

12 Claims, 1 Drawing Sheet

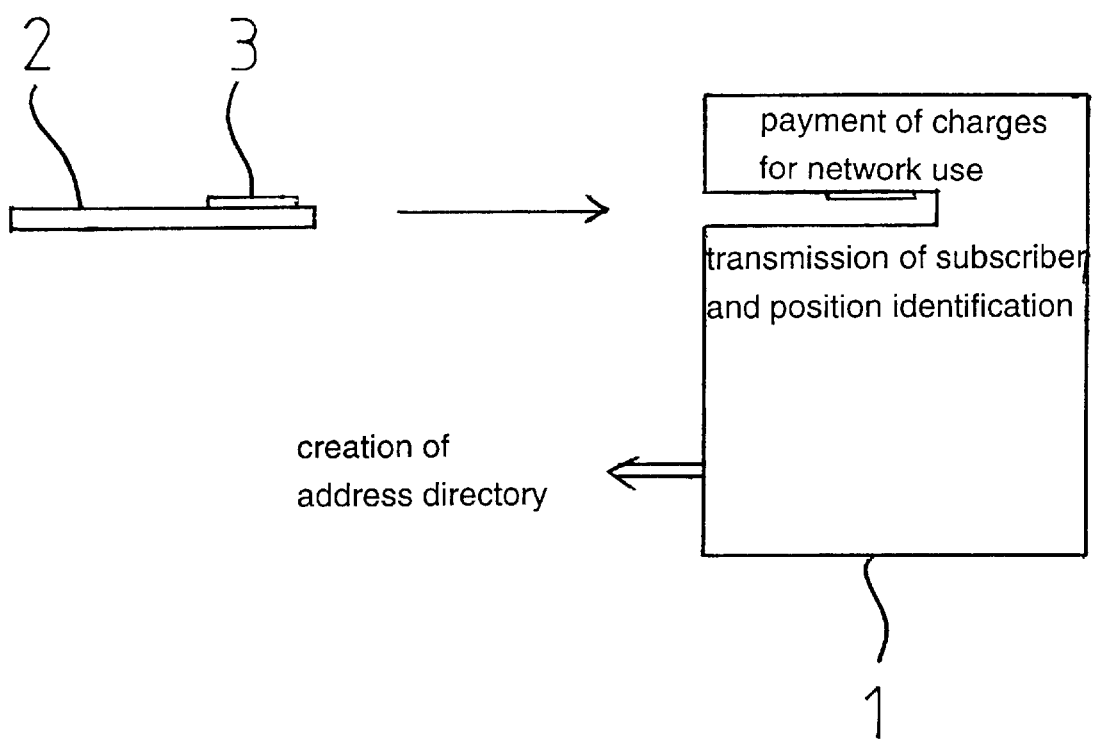

PROCESS FOR GENERATING AN ADDRESS DIRECTORY

BACKGROUND OF THE INVENTION

The invention relates to a method of creating an address directory from address data of subscribers in a telecommunications network, wherein the address data comprise a subscriber identification and a position identification allocated to the subscriber.

SUMMARY OF THE INVENTION

An address directory of the kind under discussion is known, for example, in the form of a conventional telephone directory. In this instance, the subscriber identification is formed by the name of the person having a telephone connection, and the position identification allocated to the subscriber by the telephone number. The position allocation with respect to the telephone number results, roughly from assigning the subscribers to predetermined area code zones, and in greater detail from the initial digits of the telephone number, which reflect an association to certain stationary exchanges. Thus, an assignment of the subscribers to a certain location and, with that, a position identification exist through the telephone number of the subscriber.

In the following, the invention is described by the example of creating an address directory for a mobile radio network. In particular, the network is Applicant's mobile radio network disclosed in German Application 195 35 021.9. This mobile radio network consists of individual mobile radio sets, which serve both as a terminal and as a relay.

Contrary to Applicant's mobile radio network described in its German Application 195 35 021.9, mobile radio networks are currently in use, which comprise stationary radio equipment in the form of relay stations. These are, for example, mobile radio networks known as C1, D1, D2, and E-plus networks. In this instance, the radio link is established by means of an external switching method within the scope of an external radio network management. In these mobile radio networks, the localization of the network subscribers and the establishment of the link between the network subscribers occur by means of the central switching equipment.

When a radio link is established, the relay stations play the fundamental part, since they are in a constant reciprocal contact with the network subscribers via a division of the radio network area into individual network cells. Thus, the respective relay station always knows the location of the network subscriber by its response to the relay station and furthermore to the network control center.

When a radio link is established between two network subscribers, the network subscribers are initially localized by means of the central switching method. Subsequently, the radio link is computed or determined between the network subscribers and then offered. The preliminary computation or determination of the communication path via possible relay links is named "routing."

The known methods operate between the mobile radio sets and the stationary relay stations of the respective network cells of the known radio networks. In the known radio networks, it thus matters that externally and centrally controlled methods be applied, which are used by an external operator station—for example, a central operating computer—outside of the individual mobile radio sets or radio terminals.

The known method of establishing a radio link within the known radio networks is problematic, in that it always requires stationary transmission relays or relay stations for establishing a radio link. From that, it follows that it is always necessary to build up first a surface-covering network of stationary relay stations, when a radio network of the known kind is established or newly set up. This considerably reduces the flexibility of a network system with respect to a new implementation.

In the mobile or relay radio network disclosed in German Application 195 35 021.9, the individual network subscribers are allocated an individual, location-dependent position identification for establishing a radio link even without stationary relay stations, so that the position of all network subscribers relative to one another is defined.

The determined position identification of the network subscribers relative to one another enables a stepwise establishment of a radio link from network subscriber to network subscriber. The provision of separate stationary relay stations is no longer needed. To establish a radio network, a source subscriber need to know only its own position identification and the position identification of the destination subscriber. The radio link is then established via further network subscribers between the source subscriber and the destination subscriber, which-due to their knowledge of their own position identification, are able to retransmit a radio signal that is transmitted from the source subscriber, in the direction toward the destination subscriber. The allocation of a position identification makes it possible to connect the network subscribers in the relay radio network, addressed as a function of location and direction and directed to the destination.

In the method of establishing a radio link, localization of the network subscriber and determination of the radio path between the network subscribers are not exactly performed by means of stationary relay stations and determined radio network cells. When establishing the radio link, the direction of the radio path to the desired destination subscriber is tendentiously predetermined in terms of direction via the stepwise determination of the successive relay radio paths via further network subscribers. While the radio link is established or offered, the radio link is not yet definitely determined up to the determination of the last stage of the radio path. From that, it may follow that possibly a plurality relay radio paths are simultaneously selected, and that a multiway propagation occurs, or a plurality of parallel radio links are established.

As regards a particularly simple allocation of position identifications, it would be possible to determine the position relative to radio-signal-emitting radio signalers with a predeterminable location. To this end, it would be possible to provide at least three radio signalers. The radio signalers could then emit the radio signals at certain times or after certain time intervals. The receipt of the radio signals from the predeterminable locations makes it possible to determine in a simple manner the position of the receiving network subscriber relative to the radio signalers. This enables a clear position determination and a clear allocation of a position identification.

In the presence of, for example, three radio signalers, the radio signal of the first radio signaler could arrive, taking into account relay delays, at the particular network subscriber after 1 second, the radio signal of the second radio signaler after 3 seconds, and the radio signal of the third radio signaler after 5 seconds. From that, it would be possible to generate a position identification of 1-3-5.

A further possibility of generating a position identification could be derived from increasing a counted value dependent on the number of transmissions, or from increasing a counting argument within the radio signal. In other words, during each transmission of the respective radio signal, a numerical value is increased, for example, by 1. In the presence of, for example, three radio signalers, a position identification could consist of the respective number of transmissions of the particular radio signal, as follows. For example, once the first radio signal is through with three transmissions, the second radio signal with ten transmissions, and the third radio signal with twenty transmissions, a position identification of 3-10-20 would be possible. With that, it would be possible that during the retransmission in the radio network, the radio signals of the radio signalers undergo a location-dependent and/or direction-dependent change of counting arguments, which contain the radio signals, by a continued counting by the respective transmitters. In other words, a location-dependent and direction dependent differentiation of the position sequences is realized. During the transmission, each transmitter chronologically counts or continues to count a number of steps, and it changes or adds same as an information component in the transmitter signal. These position identifications develop as a function of location and as a function of direction over the network area because of the continued counting of the number of steps.

A third possibility of the position identification could be realized, if the radio signaler consisted of satellites of the ground positioning system (GPS). In this instance, the network subscribers receive as signals their absolute geographic position. Same consists of the parameters geographic latitude and geographic longitude. The position identification could then comprise only the geographic position data received via the GPS.

When the radio link is established or generated, it will be possible that the network subscribers address the desired destination subscribers with these position identifications.

For the generation of the radio link, it is essential that the observed network subscriber know both its own position identification and the position identifications of the source subscriber—if need be, of the network subscribers themselves—and of the destination subscriber.

The identification of the destination subscriber is known to the user or the source subscriber from a kind of telephone directory—the address directory—which contains all position identifications of the destination subscribers. Such a telephone directory may be present at the source subscriber in the form of an electronic storage. The actualization of the telephone directory occurs after each allocation procedure of the position identification. This allocation procedure may occur daily, hourly, or in even shorter time intervals.

It is possible to renew or change again the position identification of a destination subscriber after a renewed action by the radio signaler, and to transmit it in a previously offered radio link to the transmitters and the source subscriber.

It is necessary to actualize as often as possible the address directory with all subscribers as is required for the mobile radio network of German Application 195 35 021.9, since not all subscribers remain stationary. A method of allocating such position identifications is described in German Application 197 26 56.7.

It is therefore the object of the present invention to describe a method of creating an address directory of the initially described kind, which realizes a simple creation of the address directory.

In accordance with the invention, the foregoing object is accomplished by a method which is carried out such that during a payment of charges for the use of the telecommunications network, the address data of the subscriber are transmitted at least in part to a data acquisition station.

According to the present invention, it has been recognized that the creation of an address directory benefits in particular from transmitting corresponding address data of the subscriber to a data acquisition station and/or data acquisition equipment within the scope of a payment procedure of the charges for the use of the telecommunications network. Thus, the data transmission is coupled with a payment procedure of the charges. Such payments of charges are always required after certain time intervals before and/or after a use, so that an actualization of the address directory can occur in an elegant and simple manner, quasi at the same time as the payment of charges. Thus, a separate actualization procedure with respect to the address data is not needed, after the subscriber changes its location.

Consequently, a method of creating an address directory is described, which realizes a simple creation of the address directory.

Concretely, the transmission of address data during a payment of charges could signify the transmission of address data before and/or during and/or after the transmission of data relating to the payment of charges. In other words, there could exist a parallel or sequential transmission of address data and data relating to the payment of charges. For example, data, which relate to the payment of charges, could be data relating to the amount of the charges being paid.

In a particularly user-friendly manner, the data could be automatically transmitted. In this instance, the user would not have to see to the transmission of data. Alternatively, it would be possible to transmit address data only upon a special request of the subscriber, for example, after a change in location of the subscriber.

In a particularly time-saving manner, the address directory could be created by the data acquisition station itself. In this connection, it is also possible that the data acquisition station receives from the subscriber not only current address data, but also supplies the subscriber at the same time with current address data of other subscribers, preferably in the form of a complete address directory of all subscribers.

Furthermore, it would be possible that for creating the address directory, the data acquisition station retransmits the address data to a third party. The makers of the address directory—the data acquisition station or a third party—could make available address information only against payment of charges. Likewise, such a payment of charges for an address information means a payment of charges for the use of the telecommunications network, since obtaining such information represents a use of the telecommunications network. To this extent, at least a partial transmission of address data from the subscriber to a data acquisition station could also occur during a payment of charges for obtaining an information.

In a particularly practical manner, it would be possible that the data acquisition station performs the billing of charges for the use of the telecommunications network. In other words, the data acquisition station is at the same time also the place of payment for any charges whatsoever.

Furthermore, the data acquisition station could also be a financial institution, which debits the account of the subscriber within the scope of the payment procedure. In this instance, the address directory could be created by the financial institution.

BRIEF DESCRIPTION OF THE DRAWING

The attached drawing schematically illustrates a method of creating an address directory in accordance with the present invention.

DETAILED DESCRIPTION OF A PREFERRED EMBODIMENT

As regards a simple transmission of address data, the transmission could be performed by an information carrier 2;.A>7that comprises a memory 3. In a particularly simple manner, such an information carrier could be in the form of a chip card, a magnetic strip card, or a PIN card. As further examples, the information carrier could be a credit card, a cash card, an automatic teller machine card, or a telephone card. Furthermore, the information carrier could be formed also by an SIM card or a similar card, which is decisive for releasing the use by a subscriber in the telecommunications network. It would be possible to put the address data of the subscriber in the memory 3, so as to make an access as easy as possible during the payment of charges. Billing of charges could be performed by a method and an apparatus as disclosed in DE 197 19 002 A1. Accordingly, the charges could be billed via an information carrier in the form of a chip card or magnetic strip card. The data necessary for billing the charges are transmitted from the information carrier to the data acquisition station or to the financial institution.

In a particularly reliable manner, the transmission could occur while arranging the information carrier in a transmission means 1. An automatic teller machine offers itself as a transmission means. Such an automatic teller machine could be designed and constructed not only for paying charges, but also for withdrawing cash. For purposes of writing and reading out the memory, the transmission means 1 could comprise a write/read unit for the memory. On the one hand, this will enable a transmission of address data of the subscriber, and on the other hand an actualization of the an address directory at the subscriber.

At any rate, for transmitting data, a suitable connection is to be ensured between the transmission means and the data acquisition station.

As an alternative or in addition to a possibility of transmitting address data in a transmission means, the transmission could occur via a radio link with the data acquisition station. It would be possible to realize the radio link via a mobile radio set of the subscriber.

As an alternative or in addition thereto, the transmission could occur by optics, preferably via an infrared link with the data acquisition station. To this end, a mobile radio set of the subscriber could comprise an infrared interface.

As a further alternative or yet in addition thereto, the transmission could occur via an ultrasound link with the data acquisition station. In this instance, a mobile radio set of the subscriber could comprise an ultrasound interface.

In the case of the mobile radio network disclosed in German Application 195 35 021.9, it is possible to renew or change again the position identification of a destination subscriber after a renewed action of the radio signaler, and to transmit it in a previously offered radio link to the transmitters and the source subscriber. In other words, it is possible that a subscriber has not only its own address data, but also address data of other subscribers. Consequently, it would be especially advantageous as regards an address directory that is as current and complete as possible, if the address data transmitted by the paying subscriber comprised both address data of the paying subscriber and address data of one or more other subscribers. In this instance, a reciprocal adjustment as a whole could occur between the address data stored at the subscriber and the address data stored at the data acquisition station. The adjustment could comprise all address data in the storage of the subscriber and all address data at the data acquisition station.

Each subscriber will be interested in making a payment of charges as often as possible, since only this could enable an actualization of its address in the general address directory, if need be. Only thus would it be possible to ensure in a reliable manner the accessibility of the individual subscriber after a change in location.

What is claimed is:

1. Method of creating an address directory from address data of subscribers in a decentralized radio network, wherein the address data comprise a subscriber identification and a position identification allocated to the subscriber, which are made available to the other subscribers, wherein substantially simultaneously with a payment of charges for the use of the decentralized radio network, the position identification of the subscriber is transmitted from the subscriber to a financial institution serving as a data acquisition station for creating the address directory, and wherein as part of the payment of charges procedure, the financial institution debits an account of the subscriber accordingly.

2. Method of claim 1, wherein the transmission of the position identification occurs automatically.

3. Method of claim 1, wherein the data acquisition station creates the address directory.

4. Method of claim 1, wherein the data acquisition station retransmits address data for creating the address directory to a third party.

5. Method of claim 1, wherein the transmission of the position identification occurs via a radio link with the data acquisition station.

6. Method of claim 1, wherein the transmission of the position identification occurs by optics, preferably via an infrared link with the data acquisition station.

7. Method of claim 1, wherein the transmission of the position identification occurs via an ultrasound link with the data acquisition station.

8. Method of claim 1, wherein the position identification transmitted by a paying subscriber comprises both the position identification of the paying subscriber and the position identification of one or more other subscribers.

9. Method of claim 1 wherein the transmission of the position identification occurs via an information carrier comprising a memory, while the information carrier is arranged in a transmission means.

10. Method of claim 9, wherein the information carrier is in the form of a chip card, magnetic strip card, or PIN card.

11. Method of claim 9, wherein the transmission means is an automatic teller machine.

12. Method of claim 9, wherein the transmission means comprises a write/read unit for the memory.

* * * * *

UNITED STATES PATENT AND TRADEMARK OFFICE
CERTIFICATE OF CORRECTION

PATENT NO. : 6,609,000 B1  Page 1 of 1
APPLICATION NO. : 09/601486
DATED : August 19, 2003
INVENTOR(S) : Arnold It is certified that error appears in the above-identified patent and that said Letters Patent is hereby corrected as shown below:

Title page,

Item [56], References Cited, FOREIGN PATENT DOCUMENTS, insert the following:

--CA  2,160,278   6/1996
 WO  98/00988   1/1998--.

Signed and Sealed this

Sixteenth Day of October, 2007

JON W. DUDAS
*Director of the United States Patent and Trademark Office*